United States Patent
Li et al.

(10) Patent No.: US 11,836,245 B1
(45) Date of Patent: Dec. 5, 2023

(54) APPARATUS AND METHOD FOR E-MAIL BASED DIGITAL FOOTPRINT SANITIZATION

(71) Applicant: Anonyome Labs, Inc., Salt Lake City, UT (US)

(72) Inventors: Qing Li, Cupertino, CA (US); Christopher David Ciborowski, San Jose, CA (US); Steven Harvey McCown, Mapleton, UT (US)

(73) Assignee: Anonyome Labs, Inc., Salt Lake City, UT (US)

( * ) Notice: Subject to any disclaimer, the term of this patent is extended or adjusted under 35 U.S.C. 154(b) by 0 days.

(21) Appl. No.: 18/193,385

(22) Filed: Mar. 30, 2023

Related U.S. Application Data

(60) Provisional application No. 63/488,872, filed on Mar. 7, 2023.

(51) Int. Cl.
*G06F 21/53* (2013.01)
*G06F 21/57* (2013.01)

(52) U.S. Cl.
CPC .............. *G06F 21/53* (2013.01); *G06F 21/57* (2013.01)

(58) Field of Classification Search
CPC .................................. G06F 21/53; G06F 21/57
See application file for complete search history.

(56) References Cited

U.S. PATENT DOCUMENTS

| | | | | |
|---|---|---|---|---|
| 2009/0248814 A1* | 10/2009 | Kelly | ..................... | H04L 51/212 709/206 |
| 2010/0250579 A1* | 9/2010 | Levow | ................. | G06Q 10/107 707/769 |
| 2015/0350132 A1* | 12/2015 | Karnin | ..................... | H04L 51/10 709/206 |
| 2017/0331777 A1* | 11/2017 | Brisebois | ............... | H04L 51/212 |
| 2021/0250318 A1* | 8/2021 | Kwon | ................... | H04L 51/226 |
| 2022/0239633 A1* | 7/2022 | Dupont | ................. | H04L 51/212 |

* cited by examiner

*Primary Examiner* — Beemnet W Dada
(74) *Attorney, Agent, or Firm* — Cooley LLP

(57) ABSTRACT

An apparatus has a network interface circuit providing connectivity to a network with network connected client machines hosting email client modules controlling email inboxes. A processor is connected to the network interface circuit. A memory is connected to the processor. The memory stores instructions executed by the processor to scan the email inboxes to identify statistically infrequently received emails from different network connected service providers. Protocols utilized by the different network connected service providers to accept user data delete requests are identified. The protocols are executed.

14 Claims, 1 Drawing Sheet

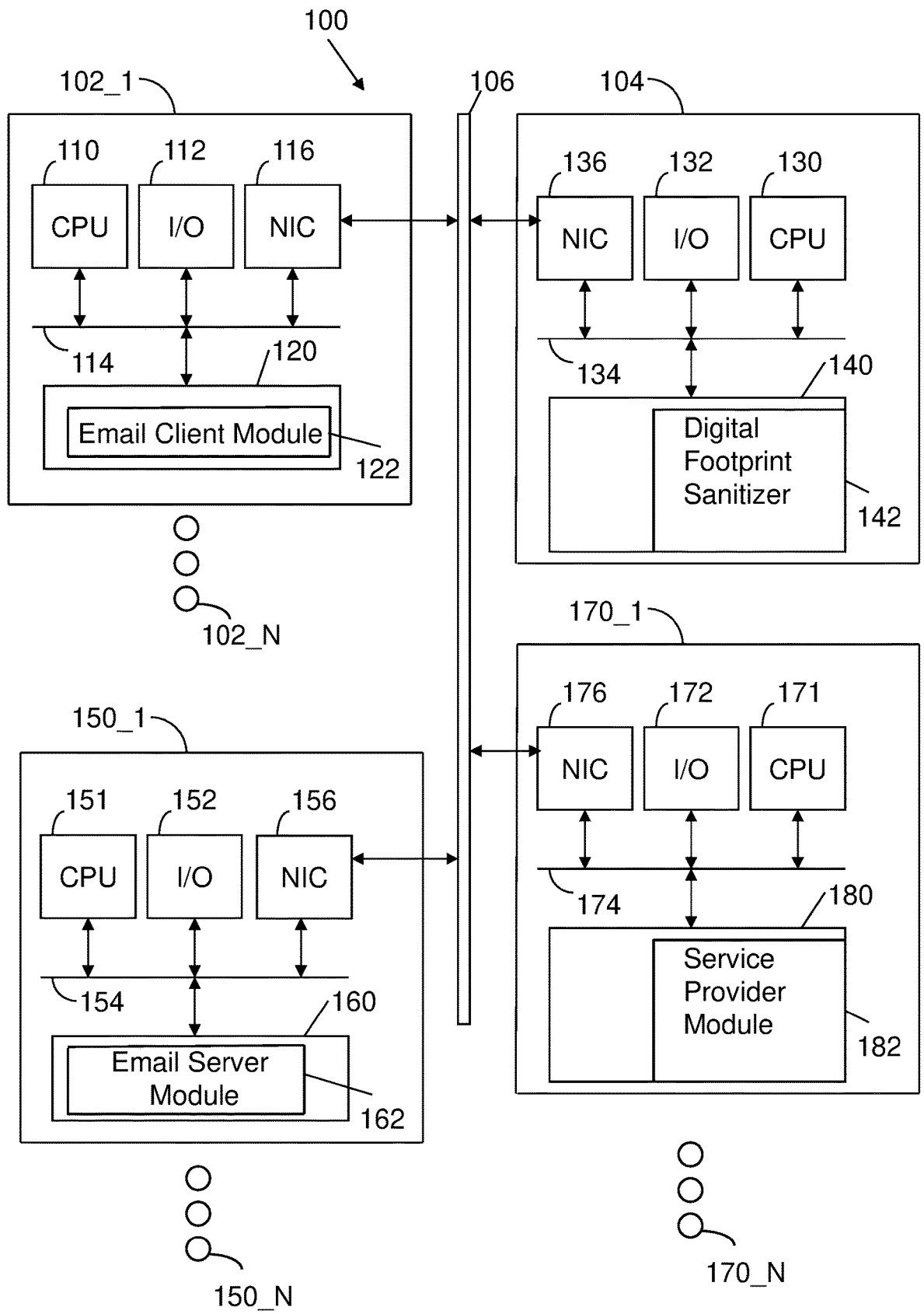

APPARATUS AND METHOD FOR E-MAIL BASED DIGITAL FOOTPRINT SANITIZATION

CROSS-REFERENCE TO RELATED APPLICATION

This application claims priority to U.S. Provisional Patent Application 63/488,872, filed Mar. 7, 2023, the contents of which are incorporated herein by reference.

FIELD OF THE INVENTION

This invention relates generally to communications in computer networks. More particularly, this invention is related to techniques for e-mail based digital footprint sanitization.

BACKGROUND

If a user examines the contents of her email inboxes at various email accounts, she can derive a great deal of insight regarding which companies and individuals may hold her personal data. Her mailbox is comprised of a vast assortment of senders, each of whom has various types of information. At minimum, these senders know her email address and possibly her name. However, with the ubiquity of online accounts, these senders clearly can possess much more than just an email address. A brief and somewhat incomplete list of these types of accounts is as follows:

- Retailers (Amazon®, BestBuy®) have payment information, phone number, and address
- Flight and travel vendors (Expedia®, Uber®) can track travel history
- Restaurants (OpenTable®, Resy®, countless restaurants) can track dining habits
- Utilities and subscriptions (AT&T®, Netflix®, Hulu®) can track personal interests
- Loyalty programs (Safeway®, Sephora®) can track purchase histories
- Dating and social media (Facebook®, Tinder®, Instagram®) can track social interactions
- Banks (Chase®, BofA®) can track purchases
- Any site or app can track browsing behavior (via $3^{rd}$ party trackers), location history, or device information This list is woefully incomplete but illustrates how much personal information can be spread all over the Internet. These companies are called "service providers" herein. Any time anyone who signs up for an account, she surrenders some information. Laws such as the California Consumer Privacy Act (CCPA), the California Privacy Rights Act (CPRA) and the General Data Protection Regulation (GDPR) allow consumers to request a copy of the information a service provider may possess about a specific individual. These laws also provide consumers with the option to request that this data be deleted permanently—also known as "the right to be forgotten." A user does not request deletion of accounts regularly used. On the other hand, what about all the services that are no longer used or one-off purchases? Even if those services are no longer used, they still retain data. Most individuals have scores of accounts that fall into this category. These individuals have commonly forgotten about the service providers, but they have not forgotten them.

By examining the mailbox one can extract information regarding what service providers one may have established a relationship in the past, regardless of whether that relationship is still active. Once acquired, service providers often sell or share a consumer's information with other third parties. This is one of the reasons why we constantly receive junk emails. Examining the mailbox also allow one to derive the list of potential third parties who may have obtained one's private information indirectly.

Thus, there is a need for users to scrutinize their e-mail accounts to sanitize them in a manner that protects individual privacy by deleting personal data from data holders to reduce unwanted communications.

SUMMARY OF THE INVENTION

An apparatus has a network interface circuit providing connectivity to a network with network connected client machines hosting email client modules controlling email inboxes. A processor is connected to the network interface circuit. A memory is connected to the processor. The memory stores instructions executed by the processor to scan the email inboxes to identify statistically infrequently received emails from different network connected service providers. Protocols utilized by the different network connected service providers to accept user data delete requests are identified. The protocols are executed.

BRIEF DESCRIPTION OF THE FIGURES

The invention is more fully appreciated in connection with the following detailed description taken in conjunction with the accompanying drawings, in which:

FIG. 1 illustrates a system configured in accordance with an embodiment of the invention.

Like reference numerals refer to corresponding parts throughout the several views of the drawings.

DETAILED DESCRIPTION OF THE INVENTION

FIG. 1 illustrates a system 100 configured in accordance with an embodiment of the invention. The system 100 includes a set of client machines 102_1 through 102_N in communication with a server 104 via a network 106, which may be any combination of wired and wireless networks. Email server machines 150_1 through 150_N are also connected to network 106, as are service provider machines 170_1 through 170_N.

Client device 102_1 may be a desktop computer, a laptop computer, tablet, smartphone, and the like. Each client machine, such as machine 102_1, includes a processor (e.g., a CPU) 110 and input/output devices 112 connected via a bus 114. The input/output devices 112 may include a keyboard, mouse, touch display and the like. A network interface circuit 116 is also connected to bus 114 to provide connectivity to network 106. A memory 120 is also connected to the bus 114. The memory stores an email client module 122 that is operative as a user's email client inbox. The email client module 122 may be web-based email using a browser, a mobile application on an iOS® or Android® device, or an email client, such as Microsoft Outlook 365® or Mozilla Thunderbird® on Windows®, Mac OS® or a Linux® based system.

Server 104 includes a processor 130, input/output devices 132, a bus 134 and a network interface circuit 136. A memory 140 is connected to bus 134. The memory 140 stores a digital footprint sanitizer 142 with instructions executed by processor 130 to implement operations disclosed herein.

The email server machines 150_1 through 150_N each include a processor 151, input/output devices 152, a bus 154 and a network interface circuit 156. A memory 160 is connected to the bus 154. The memory stores an email server module 162 with instructions executed by processor 151 to implement email server operations and to interact with the email client module 122.

The service provider machines 170_1 through 170_N each include a processor 171, input/output devices 172, a bus 174 and a network interface circuit 176. A memory 180 is connected to bus 174. The memory stores a service provider module 182 with instructions executed by processor 171 to implement network connected services such as retail services, travel services, loyalty programs, social media, banking, and the like.

Most email server modules (e.g., Gmail®, Outlook®, Yahoo®) 162 allow users to delegate access to their inboxes to third parties via OAuth2, which stands for "Open Authorization", a standard designed to allow a website or application to access resources hosted by other web applications on behalf of a user. The digital footprint sanitizer 142 also utilizes OAuth2 for scanning the user's inbox that are stored at the email server module 162. The digital footprint sanitizer 142 generates a list of companies which may hold the user's data. Since digital footprint sanitizer 142 uses OAuth2, user credentials are not seen or stored. The user is simply redirected to the login page for the email server module 162 (e.g., Gmail®) where they log in and explicitly allow the digital footprint sanitizer 142 to read account info, read email, and send email. Once this is done, the digital footprint sanitizer 142 is provided with an OAuth2 token that can be used in lieu of a username and password. The user can revoke access to the digital footprint sanitizer 142 at any time, rendering the token useless. The digital footprint sanitizer 142 does not retain any intermediary data. Any data that is related to an email is deleted as soon as the scan is complete. The solution described by this invention is offered as a cloud-based service. It can run inside a secure enclave to reduce attack surface of the process and to eliminate any data residues for enhanced user privacy and trust. The enclave is destroyed along with any processing data once the scan is complete for a specific user. In addition, the solution described herein executes as lambda functions to further reduce the attack surface. The scan service for one user is completely isolated from any other scan service.

Alternatively, the digital footprint sanitizer 142 can interact with the email client module 122 and scan the user's inbox at the email client module 122. In this approach the digital footprint sanitizer 142 does not require OAuth2 type of user authentication. The user has already logged into an email account through the email client module 122. The emails are already retrieved by the email client module 122 and are stored in the inbox at the email client module 122. The user's privacy is already protected by the email client module 122 and the underlying operating system. This invention does not add any additional privacy or security risk when scanning the email inbox at the email client module 122.

The described solutions mainly focus on the scenario where the email inbox is maintained at the email server module 162, the digital footprint sanitizer 142 interacts directly with the email server module 162, without the email client module 122.

Once the scan is complete, the digital footprint sanitizer 142 then presents this list of companies to the user. The user then has the option to decide whether to make data deletion requests to one or more companies on that list. Alternately, the list of companies is automatically processed in accordance with a set of pre-configured rules that specify the types of companies that should be eliminated from the list.

There are a few issues that need to be considered when implementing the disclosed solutions. For example, scanning every single email in a user's inbox is not practical. An average inbox may contain tens of thousands of emails that were accumulated over years. This poses a couple of problems:

Time—The email Application Programming Interfaces (APIs) supplied by these webmail providers have constraints. Round trip times to the server and artificial rate limits on API calls can limit the speed at which the sanitizer 142 can scan the inbox. At a rate of 5 to 10 requests per second, the scan of an inbox could take hours.

API limits—Webmail providers, while providing the API service for free, do impose daily limits on the number of calls. If sanitizer 142 scans hundreds of inboxes per day, these daily API limits are quickly exceeded.

It is important that the sanitizer 142 find as many unique senders as possible with the least number of API calls. As an alternative to the undesirable iteration through every email in the user's inbox, all the webmail APIs provide various querying capabilities. The sanitization application 142 submits a query based on some criteria and the email server 162 provides a list of email identifiers that match the query. The sanitizer 142 iterates through this list of identifiers and requests the metadata for each of the individual emails. For example, Gmail® can attach various categories to emails. If one retrieves a list of social media emails within the past year from a user's inbox, one uses the following query: category: social newer_than: 1 y.

This provides the sanitizer 142 with the ability to only view the email IDs of interest. However, since the sanitizer 142 receives only opaque identifiers, it is the responsibility of the sanitizer 142 to request the data for each email one by one. For the purposes of cataloging all the social media sites a user interacts with this entails extensive data processing. The user might only have joined a dozen or so sites in the last 10 years. But since social media sites can deliver multiple emails per day, the results of the query may force the sanitizer 142 to analyze thousands of emails. Even worse is that this query does not even cover previous years where the user may have joined and possibly abandoned other social accounts.

In this case, it is important for the sanitizer 142 to find all the unique senders while retrieving as few emails as possible from the server. Since it is likely that numerous senders have sent many emails to the user's inbox, the ideal situation is to find just one (or a few) messages from that sender and then exclude that sender from any future queries. In other words, if the user has thousands of emails from Nextdoor®, the sanitizer prefers to get just one and then exclude nextdoor.com from all subsequent queries to reduce the size of the results.

The proposed solution here is repetitive querying with an exclusion filter. Repetitive querying involves issuing the same query multiple times in a row with some added criterion— typically a different date range. Initially the criterion will be extremely restrictive and will become less restrictive with each subsequent query. The following example illustrates how the process works:

Queries={
"subject:your{account password profile}",
"category:purchases",
"category:social"

```
}
Criteria={
    "newer_than: 1 d",
        "newer_than: 1 w",
        "newer_than: 1 m",
        . . .
        . . .
        "newer_than: 1 y",
        "newer_than: 2 y",
        . . .
    Exclusion_filter={"exclude:"}
    Unique_domains={ }
    For each Q in Queries {
    For each Criterion in Criteria {
    query=Q+Criterion+Exclusion_filter
    Exclusion_filter+=each unique domain
    }
```

Each query in the query set is executed multiple times with varying criteria. As each query completes, the domain set in the exclusion filter grows and suppresses the results for any domain that the sanitizer 142 has previously seen. Once the process completes, the full set of domains are extracted from the exclusion filter. It should be appreciated that the technique is potentially leveraged to index all the senders in the inbox provided that the query list is sufficiently large.

Consider the case where a user downloads email through a local email client module 122. In this case, the email client 122 downloads the entire mailbox content into a local mailbox. It is common for the local mailbox to be synchronized with the mailbox in the cloud. Any user action performed through the local email client 122, such as deleting an email, sending an email is reflected in the cloud copy that is maintained by the email server module 162. This scenario is true for both a desktop computer email client and a mobile device-based app.

In this use case, the sanitizer 142 is installed locally as an email client extension, an operating system module, or as an independent executable program. In any case, the sanitizer 142 has full access to the local mailbox. All scan operations are performed locally, which are secured by the operating system and protected by the user account. The sanitizer 142 behaves like a locally installed virus scanner. In this embodiment, the digital footprint sanitizer 142 is resident on client machine 102_1.

When companies send emails to their users, they don't necessarily identify themselves. There is no American Registry for Internet Numbers (ARIN)-like registry of email addresses which can be used to map to a specific company. A single company can send emails to a user from multiple unique email addresses. It is common for these email addresses to be from different domains. For example, the company Bed Bath and Beyond® has sent emails from the following addresses:
   customer.service@bedbathandbeyond.com
   BedBath&Beyond@email.bedbathandbeyond.com
   customer.service@bedbath.com
   BedBath&Beyond@emailbedbathandbeyond.com That is 4 different email addresses from different domains. The sanitizer 142 determine that all 4 of these emails are from the same company. Normalization of these domain names into a known entity can be done by various means, such as finding the longest substring match using dynamic programming, combined with heuristics rules.

There is one other scenario that needs domain name normalization. There are cases where a service provider has combined with another entity due to either merger or acquisition. In this case the initial domain, e.g., comcast.net will be redirected to xfinity.com. The sanitizer 142 traces these redirections until reaching a final domain name.

Knowing who the service provider is solves part of the digital footprint sanitization problem. The next step is to determine how to submit the user data deletion request. The submission can be sending an email request to a given email address or filling out a web request form. This second step requires the sanitizer 142 to determine what the service provider's official web site is. Once known, the sanitizer 142 needs to analyze the service provider's website to
   discover information pertaining to that service provider's data retention, privacy and regulatory policies, and its compliance against GDPR, CCPA, etc.
   determine what are the supported submission methods The email domain does not always match the web domain. For example, emails from foo@etradefinancial.com correspond to the web domain www.etrade.com. This discrepancy requires that the sanitizer 142 issue HTTP Get requests and follow HTTP redirects. Invalid certificates, HTTP errors and DNS resolution failures or failed HTTP connections guide this HTTP-redirect traversal process. This process discovers various cases where the domain completely changes.

Another application of the service provider identification solution is to correlate entities (operating from a variety of email domains) that are known to be tracking or scamming users and then help the user know which trackers or scammers to avoid. Thus, it is a form of spam detection.

Once the sanitizer 142 obtains all the email senders from the above queries, the data is refined. First, companies use numerous email-only domains from which they send their emails as discussed with the Bed Bath and Beyond® example. In that example, there is one company, 4 domains. The sanitizer 142 coalesces all 4 domains so that they represent a single sender. The identity of the sender can be determined by finding their homepage on the Internet.
   1. This can be done by the following method—the HTTP Discovery method: Identify domains that look like email-only domains (e.g., emailbedbathandbeyond.com) remove the prefix of suffixes that make the sanitizer 142 to suspect that domain is an email domain (mail, mail-, email, email-, etc.)
   2. Check whether the domain is actually a web domain (e.g.,. Protonmail,com, hotmail.com, etc.)
   3. If not, remove the prefix or suffix and prepend "www." and see if the domain is a valid web domain by issuing HTTP requests and then following HTTP redirects.

If this process succeeds, the sanitizer 142 uses the domain from which it received the response as the true domain. If multiple senders map to the same true domain, they are coalesced since all senders have sent email on the behalf of the same company.

Frequently, the HTTP method does not work because the domain that is used to send email has no web presence. In this case the sanitizer uses the Email Harvesting method. This method works as follows:
   1. Download a few recent emails from the sender. More recent emails have more up-to-date hyperlinks and domain information.
   2. Extract all the links from the email payload. Links that have "privacy", "privacy policy" or "unsubscribe" in them are most likely to be relevant.
   3. Check the privacy and unsubscribe links for prefix or suffix matches. If there is a match, employ the HTTP Discovery method and follow the HTTP redirects to find the true domain. If the sanitizer 142 finds the homepage, then the process is done.

4. Otherwise, check the rest of the hyperlinks that were extracted for the prefix or suffix matches and try the same steps again. If the sanitizer 142 finds the homepage, then the process is done.
5. Otherwise, go through the entire set of links, remove any duplicated domains, and apply a distance function such as the Jaro-Winkler distance between the email domain and the link domain. Sort all the links based on their distance function score and remove any below a predetermined threshold.
6. Apply the HTTP Discovery method to each of the domains in the sorted list. If the sanitizer 142 finds a homepage, then the process is done.
7. As a last resort, if the homepage cannot be found, the domain is recorded so that it can be manually analyzed.

When the sanitizer 142 successfully determines the identity of the domain, the results are cached in a database. The sanitizer crawls each page starting at the first page of the official homepage. It deploys Artificial Intelligence (AI) or Machine Learning (ML) based natural language processing (NLP) to analyze each page's content to identify privacy related links or references. The sanitizer 142 first tries to analyze the form directly. Since web forms are often dynamically generated, the sanitizer saves the form into a PDF and then analyzes the text in the PDF file to understand the various form fields.

The sanitizer 142 automatically generates a data deletion request on the user's behalf if email submission method is discovered. The response email is again analyzed by AI/ML based NLP to confirm if a request is successful. A response may indicate a request has not been honored but it contains text that offers either additional or proper submission instructions. Such instructions may contain an alternative submission email address or a link to a form. Therefore, the sanitizer 142 iteratively repeats its submission process according to the new instructions. The same set of algorithms that are applied to the webpage analysis are applied to email response analysis.

Merely determining the identity of the email sender is insufficient. The end user needs something that is more informative and actionable. At a minimum, the user should be presented with information pertaining to exercising rights to request and/or delete information. Other pieces of information provide more context and an easily understood narrative followed by recommendations:

Information request and deletion instructions
What types of information does the company possess?
How frequently does the user interact with this company?
When did the user first interact with this company?
Has the company had any previous data breaches?
What is the potential risk for future data breaches?
What is the company's review ratings from, e.g., the Better Business Bureau (BBB)?
public review sites A recommendation may take the form: company X has had 2 major data breaches in the past 3 years; according to BBB, there are over 100 unresolved complaints filed against the company in the past 2 years; its review for general business is poor with a score of 2/5. We recommend that you discontinue with this service provider to avoid further potential breach of your data.

Interaction commencement frequency can be easily determined by examining timestamps in the user's inbox. Breach information can be determined through the usage of some third-party data feeds. The first two points are likely of the most interest here.

The content of service offering emails tends to repeat in nature but varies in form. Therefore, through random sampling of emails from a single vendor to perform extensive body text analysis, the sanitizer 142 determines with a good probability the types of information a service provider may have about a user.

An embodiment of the invention applies AI/ML based natural language processing on the body of text to decipher the type of information a company may potentially possess about a user. For example,
1. any offer from a local service provider, i.e., location-based service offering may indicate the possession of the user's home address
2. any offer for life insurance may indicate the possession of the user's age and family information
3. any offer of discount for home or automobile insurance may indicate possession of the user's financial liabilities
4. any offer for financial services may indicate possession of the user's income level
5. any offer for medical and pharmaceutical related services may indicate possession of the user's medical history
6. any offer about dating service may indicate knowledge about the user's marital status, sex and sexual orientation
7. any offer for retail items and sales promotions may indicate knowledge about the user's past shopping history and preferences Collectively this set of information allows the sanitizer 142 to formulate scores on how much private information a service provider may possess, thus providing a priority ranking for each request. Since each data deletion request must be followed through to its successful completion, this priority score ranks the pending requests for follow ups.

As an additional system, similar processes are used to help users organize and 'clean-up' their email or messaging inboxes. People tend to avoid deleting email until their inboxes contain 1000's of emails and it is too daunting to try to sift through them. This user behavior lets the email providers such as Google® to access more of the user's Personally Identifiable Information (PII) and usage data over long periods of time.

An email inbox cleaning and management system as described herein uses similar scanning and AI/ML processes to identify emails matching a user's criteria and then deleting or archiving the emails.

This invention checks for stored emails that not only contain "sensitive data", but also other types of information that the user may not want stored. This can include outdated emails, marketing emails, school emails, etc. The purpose is to identify whatever a user did not want and then to delete it or move it to another location.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include but are not limited to: magnetic media, optical media, magneto-optical media, and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using an object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
a network interface circuit providing connectivity to a network with network connected client machines hosting email client modules controlling email inboxes;
a processor connected to the network interface circuit; and
a memory connected to the processor, the memory storing instructions executed by the processor to:
scan the email inboxes to identify statistically infrequently received emails from different network connected service providers,
identify protocols utilized by the different network connected service providers to accept user data delete requests, and
coordinate execution of the protocols at the different network connected service providers to delete user data at the different network connected service providers.

2. The apparatus of claim 1 further comprising instructions executed by the processor to determine the types of information the network connected service providers have about users.

3. The apparatus of claim 1 further comprising instructions executed by the processor to selectively scan emails from a network connected service provider, using data sampling to avoid scanning all emails from the network connected service provider.

4. The apparatus of claim 1 further comprising instructions executed by the processor to filter email inboxes using previously processed service providers to progressively reduce the number of email scans to discover newly identified network connected service providers.

5. The apparatus of claim 1 further comprising instructions executed by the processor to discover websites for the network connected service providers to send data delete requests.

6. The apparatus of claim 5 further comprising instructions executed by the processor to analyze the websites for the network connected service providers to identify the protocols utilized by the network connected service providers to accept the data delete requests.

7. The apparatus of claim 6 further comprising instructions executed by the processor to analyze responses to data delete requests to determine if the data delete requests were successful.

8. The apparatus of claim 7 further comprising instructions executed by the processor to analyze responses to data delete requests to identify instructions to follow for the data delete requests.

9. The apparatus of claim 1 further comprising instructions executed by the processor to assess a level of trust to be ascribed to the network connected service providers.

10. The apparatus of claim 1 further comprising instructions executed by the processor to produce descriptive language about network connected service providers to inform data delete requests.

11. The apparatus of claim 1 further comprising instructions executed by the processor to prioritize data delete requests.

12. The apparatus of claim 1 wherein the instructions to scan the email inboxes is performed inside a secure enclave.

13. The apparatus of claim 1 further comprising instructions executed by the processor to identify email spammers using multiple domain sources.

14. The apparatus of claim 1 further comprising instructions executed by the processor to remove or archive email based upon user supplied criteria.

\* \* \* \* \*